Dec. 25, 1923.
W. J. PROSSER
1,478,675
NEUTRAL AND LOW GEAR LOCK FOR AUTOMOBILES
Original Filed April 17, 1922
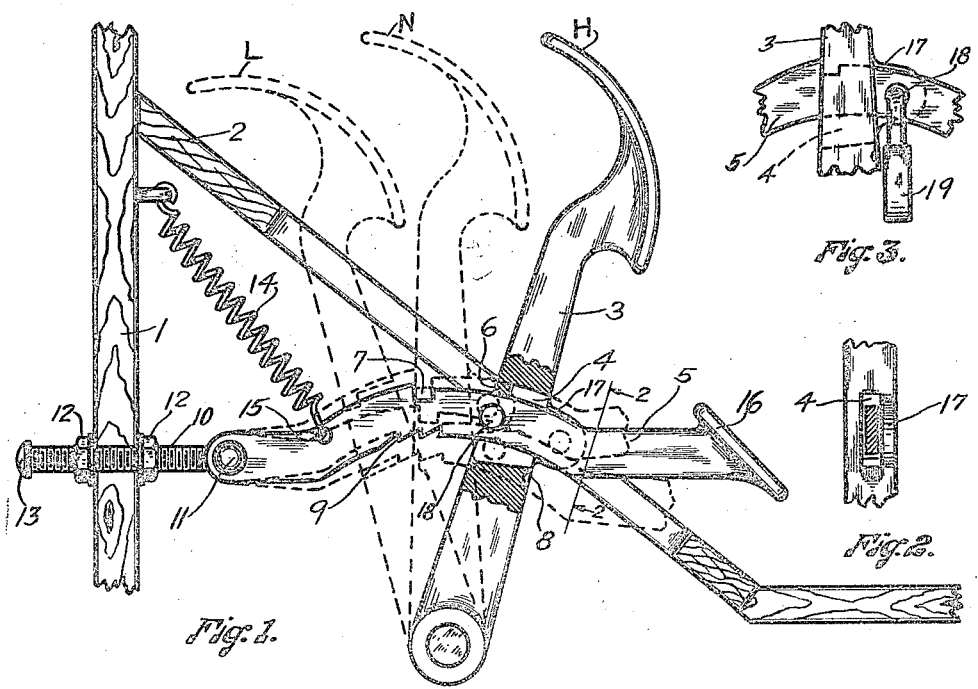
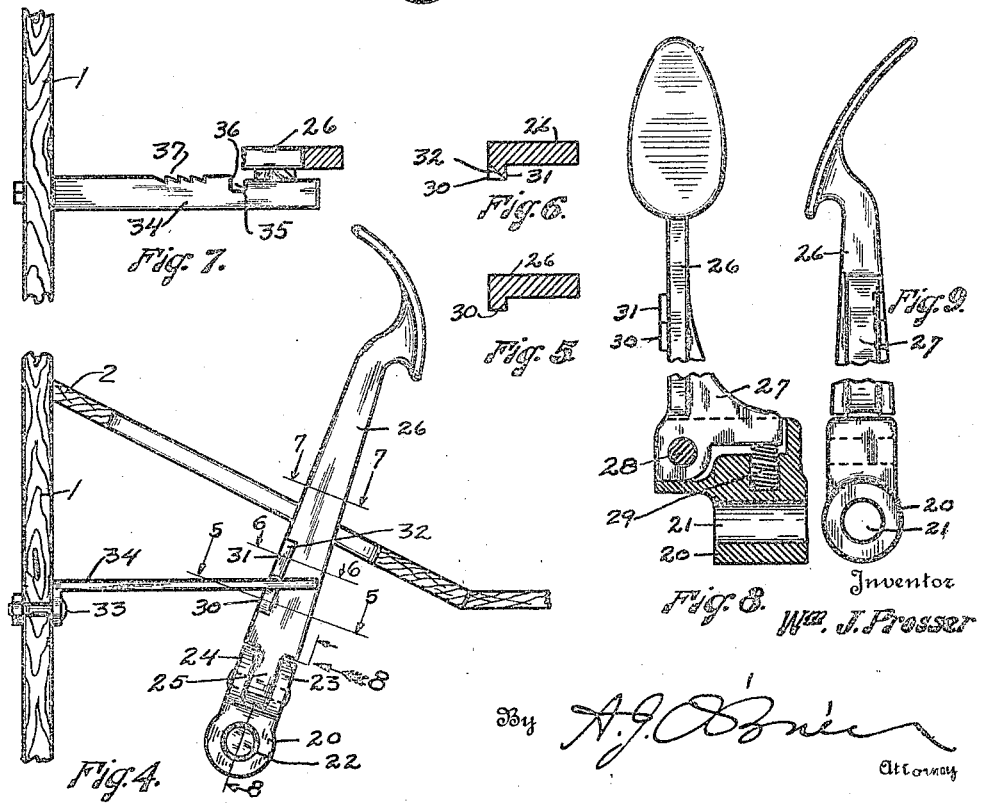

Patented Dec. 25, 1923.

1,478,675

UNITED STATES PATENT OFFICE.

WILLIAM J. PROSSER, OF DENVER, COLORADO, ASSIGNOR OF ONE-FOURTH TO W. L. WILSON AND ONE-FOURTH TO JOSEPH BAINES, BOTH OF DENVER, COLORADO.

NEUTRAL AND LOW GEAR LOCK FOR AUTOMOBILES.

Application filed April 17, 1922, Serial No. 554,004. Renewed November 12, 1923.

*To all whom it may concern:*

Be it known that I, WILLIAM J. PROSSER, a citizen of the United States of America, residing at 902 Lipan Street, in the city and county of Denver and State of Colorado, have invented certain new and useful Improvements in Neutral and Low Gear Locks for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a locking means for automobiles and has special reference to a device which is adapted to be applied to the clutch pedal of a Ford automobile.

The object of this invention is to provide a simple and reliable means that can be readily applied to a Ford automobile and which will serve to positively prevent the clutch pedal thereof from passing directly from high gear to low gear without stopping in neutral. It frequently happens that drivers will, during the excitement due to some critical situation, move the clutch pedal into low instead of neutral when they try to make a sudden stop with the result that the car continues to travel ahead in spite of the brakes, thus causing collisions or accidents.

Another object of my invention is to provide a locking means which will hold the pedal in low gear position, thus making it unnecessary for the driver to constantly apply his foot to the pedal in traveling up a steep hill.

It is a further object of my invention to provide means by which the pedal can be locked in neutral position so as to prevent unauthorized persons from appropriating the machine for their own use or from stealing the same.

I attain the above objects by means of a mechanism which I will now describe, reference being had for this purpose to the accompanying drawing in which:

Fig. 1 is a side elevation of the clutch pedal and the locking means by which it is held in place.

Fig. 2 is a section taken on line 2—2 Fig. 1 and shows the manner in which my locking member is connected with the pedal.

Fig. 3 is a side elevation of a portion of the pedal and locking member and shows how the pedal can be locked in neutral position by means of a padlock.

Fig. 4 is a modified form of my mechanism.

Fig. 5 is a section taken on line 5—5 Fig. 4.

Fig. 6 is a section taken on line 6—6 Fig. 4.

Fig. 7 is a section taken on line 7—7 Fig. 4.

Fig. 8 is a view of the pedal looking in the direction of arrow 8 Fig. 4 with a portion shown in section taken on line 8—8 Fig. 4 and Fig. 9 is a side elevation of the pedal.

The same reference numerals will be used to designate the same parts throughout the several views.

Numeral 1 represents the dash board of a Ford automobile and 2 the inclined floor boards thereof. I remove the clutch pedal with which the car comes equipped and replace it with a pedal 3 which is especially designed for the purpose under consideration and which differs from the one supplied by the manufacturer of the car mainly in this, that it is provided with an opening 4 through which my locking member 5 passes. The upper side of opening 4 is provided with a downwardly projecting lug portion 6 which is designed to engage the notch 7 in locking member 5 and the lower side of the opening is provided, on its rear edge, with a tooth or pawl 8 which is adapted to engage the teeth 9 on the underside of member 5. Locking member 5 is pivotally anchored to the dash board 1 by means of a bolt 10 which has the rear end thereof bent at right angles to the body portion and provided with a head 11. The front end of member 5 has an opening which cooperates with the end of bolt 10 to form a hinge. Bolt 10 is threaded along the whole of its length and is clamped to the dash board by means of nuts 12. When bolt 10 is in place the end thereof is riveted as indicated by numeral 13 for the purpose of preventing its removal. A tension spring 14 is secured at its upper end to the dash and at its lower end to an opening 15 in the locking member 15. Spring 14 serves to bias the locking member 5 upwardly against lug 6.

I now desire to call attention to the fact that the front wall of notch 7 is higher than the rear wall and as a result of this the forward motion of pedal 3 will always be arrested regardless of the speed at which the pedal is moved, but when the pedal is released from its forward position L, which is indicated by dotted lines, it will pass over the notch without being engaged thereby.

The operation of my device is as follows. When the pedal is in the full line position the car is running in high. When it is desired to stop or slow down the pedal is moved into neutral position, indicated by dotted line position N, and when it reaches this position the projection 6 will be engaged by the forward side of notch 7 and further forward movement prevented and at the same time the pedal will be held against rearward movement until it is released by a downward pressure on the plate 16. Should it be desirable to pass from neutral position N into low position L, the driver merely presses down on plate 16 with his heel and moves the pedal forward by the toe of his foot until the projection 8 engages with notches 9 and holds the pedal in the forward or low gear position. In going up a long hill the driver merely moves the pedal to the required forward position and locks it in place by means of the teeth 9 and the pawl 8. The driver then retains the pedal locked by a gentle downward pressure on plate 16. When he desires to change from low to high he merely releases the pressure on plate 16 and permits the spring 14 to raise the locking lever and the pedal 3 immediately returns to high position. In order to lock the machine against theft I provide the pedal 3 with a lug 17 and the locking member 5 with a hole 18 which registers with a co-operating hole in lug 17 when the pedal is in neutral position. A padlock 19 can then be used to lock the pedal against movement by inserting the bail thereof through the openings referred to.

In Figs. 4 to 9 I have shown a modified form of my neutral and low gear lock. In the modified form I replace the pedal which comes with the car by one made in the manner shown in Figs. 8 and 9. A member 20 is provided with an opening 21 which fits the end of the clutch shaft 22 and is held in place thereon by a pin or spline, not shown. The upper part of member 20 has two spaced lugs 23 and 24 between which is pivoted the end 25 of the pedal member 26. A projecting part 27 extends to one side of the pivot 28.

A spring 29 engages this projecting part and the part 20 and tends to move the pedal in a counter-clock-wise direction. On the left hand side of the pedal (Fig. 8) I provide two lugs 30 and 31, the latter of which has a beveled edge 32, Fig. 6. Secured to the rear of the dash board 1 by means of one or more bolts or rivets 33 is a locking bar 34 which extends rearwardly a sufficient distance to be always in contact with the pedal. At the point where lug 30 will be when the pedal occupies neutral position I provide a notch 35 whose front side 36 is higher than the rear side in order that it shall invariably engage the lug 30 and stop the pedal in neutral. The action of the spring 29 will move the lug 30 into notch 35 and hold the pedal in neutral position. To the front of notch 35 I provide a series of teeth 37 which will engage with the lug 31 when the pedal is in low gear position. When the driver desires to release the pedal from notch 35 he moves it against the tension of spring 29 sufficiently to release the same. In returning from low gear to high the pedal moves over notch 35 without catching therein on account of the side 36 being higher than the rear side of the notch.

I have shown no way for locking the pedal 26 in neutral but such means can be readily added if desired.

Having now described my invention what I claim is:

1. A neutral and low gear locking means for automobile transmission comprising a locking member attached to the dash board and extending rearwardly therefrom a notch therein, a pedal having a projection adapted to engage said notch when the pedal occupies neutral position, and means comprising a spring for urging said projection and said notch into engagement, said notch having its front side higher than the rear side.

2. A neutral and low gear locking means for automobile transmission comprising a locking member attached to the dash board and extending rearwardly therefrom, a notch in one side of said member, a plurality of teeth in the member between said notch and the dash board, a pedal pivotally connected to a stationary part of the automobile and adapted to contact with the locking member, a projection on said pedal adapted to engage with the notch when the pedal occupies neutral position, a second stop adapted to engage with said teeth when the pedal is in low gear position and means for urging said notch and the co-operating projection into engagement.

3. A neutral and low gear locking means for automobile transmission comprising a locking member attached to the dash board and extending rearwardly therefrom a notch in one side of said member, a plurality of teeth in the member between said notch and the dash board, a pedal pivotally connected to a stationary part of the automobile and adapted to contact with the locking member, a projection on said pedal adapted to engage with the notch when the pedal occupies neutral position, a second stop adapted to engage with said teeth when the pedal is in low gear position and means for urging said notch and the co-operating projection into engagement, said notch having its front side higher than the rear side.

4. A neutral and low gear locking means for automobile transmissions comprising a clutch pedal having a transverse opening therethrough, a downward projection on the upper wall of said opening, an upwardly projecting tooth on the lower wall of said opening, a locking bar extending through said opening, means for pivotally securing the front end of said bar to the dash board, a spring secured to said bar and tending to move the upper edge thereof against the downward projection, a notch in the upper edge of said locking member adapted to engage said projection when the pedal occupies neutral position a number of teeth in the lower edge of the locking member adapted to engage the tooth in the pedal to hold the latter in low gear position and a heel plate on the end of said locking member.

5. A neutral and low gear locking means for automobile transmissions comprising a clutch pedal having a transverse opening therethrough, a downward projection on the upper wall of said opening, an upwardly projecting tooth on the lower wall of said opening, a locking bar extending through said opening, means for pivotally securing the front end of said bar to the dash board, a spring secured to said bar and tending to move the upper edge thereof against the downward projection, a notch in the upper edge of said locking member adapted to engage said projection when the pedal occupies neutral position, a number of teeth in the lower edge of the locking member adapted to engage the tooth in the pedal to hold the latter in low gear position, said notch having its forward side higher than its rear side whereby it will positively engage said projection in its forward movement and not when the projection moves rearwardly.

In testimony whereof I affix my signature.

WILLIAM J. PROSSER.